United States Patent Office 3,084,015
Patented Apr. 2, 1963

3,084,015
PROCESS FOR DYEING OR PRINTING FIBROUS MATERIALS OF AROMATIC POLYESTERS
Paul Grossmann, Binningen, and Raymond Defago, Riehen, Switzerland, assignors to Ciba Limited, Basel, Switzerland, a Swiss company
No Drawing. Filed Oct. 25, 1960, Ser. No. 64,709
Claims priority, application Switzerland Oct. 30, 1959
6 Claims. (Cl. 8—39)

This invention is based on the observation that valuable dyeings and prints are produced on fibrous materials of aromatic polyesters, especially polyethylene terephthalates, by using as dyestuff a 1-amino-2-cyano-4-alkylamino-, especially 1-amino-4-lower alkyl-amino-, 1-amino-2-cyano-4-cycloalkylamino- or 1-amino-2-cyano-4-phenylamino-anthraquinone free from acid groups imparting solubility in water. The term lower alkyl means alkyl having at most 6 carbon atoms. The dyestuffs may be substituted in the alkyl or phenyl radical, for example, in the alkyl radical by a cyano group and in the phenyl radical by a halogen atom or an alkyl, alkoxy or hydroxyl group.

As examples of such dyestuffs there may be mentioned:

1-amino-2-cyano-4-methylamino-,
1-amino-2-cyano-4-ethylamino-,
1-amino-2-cyano-4-cyanethylamino-,
1-amino-2-cyano-4-isopropyl-amino-,
1-amino-2-cyano-4-butylamino-,
1-amino-2-cyano-4-cyclohexylamino-,
1-amino-2-cyano-4-phenylamino,
1-amino-2-cyano-4-(para- or meta-methylphenyl)-amino-,
1amino-2-cyano-4-(para-methoxyphenyl)-amino-,
1-amino-2-cyano-4-(ortho-, meta- or para-chlorophenyl)-amino- or
1-amino-2-cyano-4-(ortho-, meta- or para-hydroxyphenyl)-amino-anthraquinone.

These compounds can be obtained in known manner by heating the appropriate 1-amino-4-alkylamino-, 1-amino-4-cycloalkylamino- or 1-amino-4-phenylamino-anthraquinone-2-sulfonic acid in water with an alkali metal cyanide. Instead of a single dyestuff there may be used a mixture of such dyestuffs, and in this way the affinity is often considerably enhanced. There may be used a mixture of different dyestuffs of the kind defined above or a mixture of such a dyestuff with another dyestuff of similar structure, for example, 1:5-dihydroxy-4-nitro-8- or 1:8-dihydroxy-4-nitro-5-phenylamino-anthraquinone.

For dyeing the aforesaid dyestuffs are advantageously used in a finely dispersed form and in the presence of a dispersing agent, such as a soap, sulfite cellulose waste liquor or a synthetic detergent, or a mixture of a wetting agent and dispersing agent. It is generally of advantage before dyeing to convert the dyestuff into a dyestuff preparation which contains a dispersing agent and the finely divided dyestuff in a form such that a fine dispersion is obtained when the dyestuff preparation is diluted with water. Such dyestuff preparations can be made in known manner, for example, by reprecipitating the dyestuff from sulfuric acid and grinding the suspension so obtained with sulfite cellulose waste liquor, and, if desired, by grinding the dyestuff in a highly efficient grinding apparatus in the dry or wet state in the presence or absence of a dispersing agent.

In order to produce strong dyeings on polyethylene terephthalate fibers it is of advantage to incorporate a swelling agent in the dyebath, or to carry out the dyeing process under pressure at a temperature above 100° C., for example, within the range of 120 to 140° C. As swelling agents there may be used aromatic carboxylic acids, for example, benzoic acid or salicylic acid or phenols, for example, ortho- or para-hydroxy-diphenyl, or aromatic halogen-compounds, for example, chlorobenzene, ortho-dichlorobenzene or trichlorobenzene, or phenyl methyl carbinol or diphenyl. The dyeings so obtained are distinguished by their good fastness to sublimation and light.

The following examples illustrate the invention, the parts and percentages being by weight.

*Example 1*

1 part of an aqueous paste of the dyestuff of the formula

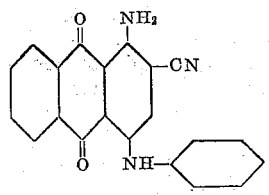

and approximately one part of dried sulfite cellulose waste liquor are ground in a roller-mill to form a fine paste having a dyestuff content of about 10%.

100 parts of a fibrous material of polyethylene terephthalate are cleaned for half an hour in a bath containing, in 1000 parts of water, 1 to 2 parts of the sodium salt of N-benzyl-μ-heptadecyl-benzimidazol disulfonic acid and one part of a concentrated aqueous solution of ammonia. The material is then transferred to a dyebath containing 3000 parts of water in which the dyestuff paste obtained as described above has been dispersed with the aid of 4 parts of the sodium salt of N-benzyl-μ-heptadecyl-benzimidazol-disulfonic acid. The whole is heated in a pressure vessel to 130° C. and maintained at that temperature for about half an hour. The material is then rinsed well, and, if necessary, washed for half an hour at 60 to 80° C. with a solution which contains, in 1000 parts of water one part of the sodium salt of N-benzyl-μ-heptadecyl-benzimidazol-disulfonic acid. There is obtained a strong greenish-blue dyeing having good properties of fastness. This dyestuff has a surprisingly good affinity for polyester fibers, in view of the fact that it has been disclosed by Salvin (American Dyestuff Reporter, 48th year (13.7.59), page 35), that this dyestuff is unsuitable for dyeing cellulose acetate silk on account of its insufficient affinity and insufficient stability in the dyebath and also owing to its slow speed of absorption.

By using, instead of 1-amino-2-cyano-4-phenylamino-anthraquinone, 1-amino-2-cyano-4-cyclohexylamino-anthraquinone there is obtained a somewhat less greenish-blue dyeing having the same good properties of fastness.

The good affinity of this dyestuff for polyester fibers is surprising because it must be concluded from Example 6 of the German Patent No. 580,012 to I.G. Farbenindustrie A.G., issued July 4, 1933, that it hardly dyed cellulose acetate silk at all.

The dyestuffs mentioned in the first and third paragraphs of this example can be obtained by the process described in British Patent No. 359,850 to I.G. Farbenindustrie A.G., accepted October 29, 1931, by heating 20 parts of sodium 1-amino-4-anilino- or 1-amino-4-hexahydroanilino-anthraquinone-2-sulfonate with 20 or 30 parts, respectively, of potassium cyanide in 1000 parts of water at a temperature of 85° C. to 140° C.

*Examples 2–10*

In the following table are mentioned further dyestuffs which dye polyethylene terephthalate fibers by the process described in Example 1 the tints given in column II.

| | Dyestuff | Tint |
|---|---|---|
| 2 | 1-amino-2-cyano-4-methylaminoanthraquinone. | Blue. |
| 3 | 1-amino-2-cyano-4-isopropylaminoanthraquinone. | Do. |
| 4 | 1-amino-2-cyano-4-n-butylaminoanthraquinone | Do. |
| 5 | 1-amino-2-cyano-4-cyanethylaminoanthraquinone. | Do. |
| 6 | 1-amino-2-cyano-4-(meta-methyl-phenyl)-aminoanthraquinone. | Greenish-blue. |
| 7 | 1-amino-2-cyano-4-(para-methyl-phenyl)-aminoanthraquinone. | Do. |
| 8 | 1-amino-2-cyano-4-(ortho-methoxyphenyl)-aminoanthraquinone. | Green-blue. |
| 9 | 1-amino-2-cyano-4-(para-methoxyphenyl)-aminoanthraquinone. | Blue-green. |
| 10 | 1-amino-2-cyano-4-(para-ethoxyphenyl)-aminoanthraquinone. | Green. |

The above mentioned dyestuffs can also be made by the process of British Patent No. 359,850, to I.G. Farbenindustrie A.G., accepted October 29, 1931, by heating the sodium salt of the appropriate 1-amino-4-alkylamino- or 1-amino-4-phenylamino-anthraquinone - 2 - sulfonic acid with potassium cyanide in water.

*Example 11*

100 parts of a fibrous material of polyethylene terephthalate are cleaned for half an hour in a bath containing in 1000 parts of water 1 to 2 parts of the sodium salt of N-benzyl - $\mu$ - heptadecyl-benzimidazol-disulfonic acid and 1 part of a concentrated aqueous solution of ammonia. The material is then treated in a bath which contains in 1000 parts of water 3 to 5 parts of diammonium phosphate and 0.5 to 1 part of N-benzyl-$\mu$-heptadecyl-benzimidazol-disulfonic acid for 10 to 15 minutes at 50° C. There are then added 3 to 5 parts of the sodium salt of ortho-phenylphenol dissolved in 1000 parts of water, and the liquor is maintained at 50 to 55° C. for 15 minutes while circulating the liquor. A dyestuff paste obtained as described in the first paragraph of Example 1 is added and the bath is brought to the boil in the course of half an hour and dyeing is carried on for 1 to 1½ hours at the boil, and the material is then rinsed while warm. A greenish-blue dyeing having good properties of fastness is obtained.

*Example 12*

The following ingredients are mixed together:

- 300 parts of gum arabic (1:1)
- 300 parts of crystal gum (1:2)
- 250 parts of water
- 40 parts of cyclohexanone
- 40 parts of thiodiglycol
- 50 parts of a solution of 100% strength of the sodium salt of meta-nitrobenzene sulfonic acid
- 20 parts of a mixture of potassium oleate and pine-oil 1000 parts Into 800 parts of the above stock thickening are stirred by means of a high speed stirring device 200 parts of the dyestuff obtained as described in the first paragraph of Example 1, the stirring being continued until the dyestuff is completely dispersed. A fabric is printed with the resulting printing paste, and the print is dried and steamed for 45 minutes under a pressure of ¾ of an atmosphere (gauge). The material is then rinsed for 10 minutes in cold water, centrifuged and dried. There is obtained a fast blue print.

What is claimed is:

1. Polyethylene terephthalate fibers dyed with a dyestuff selected from the group consisting of 1-amino-2-cyano - 4 - lower - alkylaminoanthraquinones, 1-amino-2-cyano-4-cycloalkylaminoanthraquinones and 1-amino-2-cyano-4-phenylaminoanthraquinones free from acid groups imparting solubility in water.

2. Polyethylene terephthalate fibers dyed with 1-amino-2-cyano-4-cyclohexylamino-anthraquinone.

3. Polyethylene terephthalate fibers dyed with 1-amino-2-cyano-4-phenylaminoanthraquinone.

4. Polyethylene terephthalate fibers dyed with 1-amino-2-cyano-4-(p-ethoxy-phenyl)-aminoanthraquinone.

5. Polyethylene terephthalate fibers dyed with 1-amino-2-cyano-4-isopropylaminoanthraquinone.

6. Polyethylene terephthalate fibers dyed with 1-amino-2-cyano-4-butylaminoanthraquinone.

References Cited in the file of this patent

UNITED STATES PATENTS

| 1,938,029 | Kugel | Dec. 5, 1933 |
| 2,496,414 | Seymour et al. | Feb. 7, 1950 |
| 2,881,045 | Mecco et al. | Apr. 7, 1959 |
| 2,922,691 | Grossman | Jan. 26, 1960 |
| 2,926,987 | Freyermuth et al. | Mar. 1, 1960 |
| 2,937,190 | Straley et al. | May 17, 1960 |
| 3,005,822 | Jenny | Oct. 24, 1961 |

FOREIGN PATENTS

| 359,850 | Great Britain | Oct. 29, 1931 |